United States Patent [19]

Kunkle et al.

[11] 4,030,941
[45] June 21, 1977

[54] METHOD FOR REDUCING THE VISCOSITY AND FOR REFINING KAOLIN CLAYS

[75] Inventors: Albert C. Kunkle; Carl E. Kollmar, Jr., both of Macon, Ga.

[73] Assignee: J. M. Huber Corporation, Locust, N.J.

[22] Filed: Oct. 12, 1976

[21] Appl. No.: 731,141

Related U.S. Application Data

[63] Continuation-in-part of Ser. No. 591,737, June 30, 1975.

[52] U.S. Cl. .................................. 106/309; 106/72; 106/288 B; 106/308 B
[51] Int. Cl.² ............................................ C09C 1/42
[58] Field of Search ............... 106/288 B, 309, 72; 423/118, 328; 252/317

[56] References Cited

UNITED STATES PATENTS

| | | | |
|---|---|---|---|
| 3,510,330 | 5/1970 | Talvenheimo | 106/72 |
| 3,510,331 | 5/1970 | Talvenheimo et al. | 106/72 |

*Primary Examiner*—Winston A. Douglas
*Assistant Examiner*—J. V. Howard
*Attorney, Agent, or Firm*—John R. Kirk, Jr.; Harold H. Flanders

[57] ABSTRACT

A method for reducing the viscosity and for refining crude kaolin clays is disclosed. The inherent viscosities or crude kaolin clay ores, particularly those having acceptable optical and purity properties for use in preparing paper coating pigments, but normally rejected because of their high inherent viscosities, are significantly reduced by contacting an aqueous slurry of the crude clay with an inorganic polymeric complex having the general formula

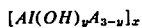

wherein $x = 6$ to $24$, $y = 1.0$ to $2.75$ and $A$ is selected from the group consisting of $Cl^-$, $(SO_4^=)_{0.5}$ and $NO_3^-$. In a preferred embodiment the above treated clay is also subjected to a high shear mixing action or kneading prior to further conventional processing procedures, such as fractionation, leaching, etc. The treatment of the clay with the above polymer complex and high shear mixing or kneading have a synergistic effect in providing a refined clay product having significantly lower viscosity when dispersed or slurried. The refined products produced in accordance with the method thus have particular use as paper coating pigments.

27 Claims, No Drawings

METHOD FOR REDUCING THE VISCOSITY AND FOR REFINING KAOLIN CLAYS

CROSS-REFERENCE TO RELATED APPLICATION

This application is a continuation-in-part of application Ser. No. 591,737, filed June 30, 1975, which has been examined and found allowable for issuance of Letters Patent.

BACKGROUND OF THE INVENTION

1. Field of the Invention

The present invention relates to the processing of kaolin clays, and more particularly pertains to the production of high grade, refined kaolin clay pigments useful as paper coating pigments from crude kaolin clay ores having high inherent aqueous slurry viscosities.

2. Description of the Prior Art

As known in the art, variations in the properties of crude kaolin clay ores are common and are the result of such factors as the mineral composition of the ore, its particle size or shape, the particle size distribution, and the like. Within certain defined limits it is possible to alter the properties of kaolin clays by certain processing techniques, such as fractionation or classification, delamination, treatment with chemical additives, such as leaching agents, flocculants, dispersants, etc. Thus, it has become common practice in recent years in the production of refined high grade kaolin clays, such as that required in coating paper, to deflocculate the crude ore in an aqueous suspension, to classify and fractionate the crude into fine and coarse fractions and thereafter to delaminate, leach, and/or otherwise treat the crude fractions with various chemicals and/or additives to produce a finished clay product. More detailed discussions of such known processes are disclosed in U.S. Pat. Nos. 3,301,691; 3,371,988; 3,320,027; and 3,442,677, to name a few.

Notwithstanding the fact that there are many known and commercially advantageous processes for refining kaolin clays, there remains a significant problem in this area. This problem lies in the fact that the clay-water viscosity is an important factor of whether or not a clay may or may not be used in a given application or end use. One of the most important uses of kaolin clay is as a pigment in coating paper to produce a desired finish or gloss. In conventional paper coating techniques, the clay pigment in the form of an aqueous slip or slurry is normally employed in a coating formulation which is applied to the paper. However, in the paper industry, very high machine speeds are required to apply this coating. Also, in order to obtain adequate drying rates concentrated slurries of the clay pigment are used. Therefore, the viscosity of the clay slip is particularly significant, and paper coating grade kaolin clays are sold under certain rigid viscosity specifications.

In this regard a large amount of Georgia kaolin clay reserves suitable from the standpoint of color and purity for refining into paper coating pigments is at a viscosity too high for such commercial use. More particularly, such crude kaolin clay ores have such high native or inherent clay/water viscosities that they are incapable of being refined into acceptable paper coating clay pigments in accordance with conventional clay pigment refining procedures. As a result it has heretofore been necessary, in mining kaolin clays for producing paper coating pigments, to reject those portions of the clay ore whose native viscosity is at an undesirably high level. While prior art workers have expended much time and effort in attempting to solve this problem none have proved to be totally successful so far as is known, and at the present, high viscosity kaolin crudes are usually rejected for producing paper coating clay pigments.

SUMMARY OF THE INVENTION

In summary, the present invention is a new and improved process for reducing the clay-water viscosity of kaolin clays normally having inherent high clay-water viscosities for the production of high grade, refined kaolin clay pigments therefrom. The advantages of opening up for use a large segment of existing and available crude kaolin clay ores heretofore not suitable because of viscosity associated difficulties is apparent.

In its broadest aspect, the present invention is based on the remarkable and unexpected discovery that the inherent high clay/water viscosity of crude kaolin clays can be significantly reduced by treating the crude kaolin clay ores, in the form of an aqueous clay slurry, with an inorganic polymeric complex having the formula $$[Al(OH)_y A_{3-y}]_x$$

wherein $x = 6$ to $24$, $y = 1.0$ to $2.75$ and $A$ is selected from the group consisting of $Cl^-$, $(SO_4^=)_{0.5}$ and $NO_3^-$. Accordingly, the treatment may be carried out by adding the above inorganic polymeric complex to the aqueous clay slurry, e.g., following the initial formation of the aqueous clay slurry, or by adding appropriate compounds to the aqueous clay slurry which are capable of in situ formation of the above inorganic polymeric complex. In one advantageous method embodiment it has been found that particularly superior and significant results in clay/water viscosity reductions are obtained by also subjecting the kaolin clay to a high speed mixing action of kneading, preferably prior to further conventional-type clay processing, i.e., fractionation, leaching, filtration, drying and the like. Unexpectedly, the treatment of crude kaolin clay/water slurries with the above inorganic polymeric complex and kneading steps have been discovered to provide a synergistic effect in significantly reducing clay/water viscosities of kaolin clay ores normally rejected because of their high inherent viscosities so that they can now be successfully processed to produce high grade pigment slurries having acceptable viscosities and slurry stabilities for the paper coating industry.

It is accordingly a general object of the present invention to provide a novel method for reducing the inherent high clay-water viscosity of crude kaolin clay ores.

A further object is to provide a method for processing and refining crude kaolin ores having high clay/water viscosities for producing high grade clay pigments suitable for use as paper coating pigments.

It is yet a further object to provide a method for reducing the viscosity of high inherent viscosity crude kaolin clay ores and for refining and processing the ores whereby conventional clay processing procedures may be carried out to provide a refined clay product capable of forming a stable slurry with acceptable clay/water viscosity for use in conventional paper coating techniques.

Other objects and advantages of the present invention not specifically set forth will become apparent from the following detailed description and appending claims.

DETAILED DESCRIPTION OF THE INVENTION

Before turning to the more specific details of the present invention, the processing steps conventionally employed for refining kaolin clay ores to produce high grade paper coating clay pigments will be briefly described. Generally speaking, the crude kaolin clay ore from the mine is initially crushed and slurried with water by "blunging", i.e., moderate mixing, to produce a clay slip or slurry, usually having a solids content of about 40 wt.% (basis dry clay). Coarse particles and organic contaminants are then removed by passing the slurry through a suitable screening device and adding a suitable oxidizing agent, such as hydrogen peroxide, if required. The degritted slurry is then normally classified or fractionated to the desired clay fraction by using either gravity sedimentation or centrifugal forces. During blunging, the clay slurry may be treated with a peptizing or dispersing agent in order to achieve maximum dispersion of the clay particles to facilitate fractionation into a coarse fraction and a suspended fine fraction. Thereafter these slurry fractions are subjected to further refining or processing steps as, for example, leaching, delamination, etc.

The fine fraction of the slurry is usually employed to produce the high grade paper coating clay pigments. Accordingly, further processing steps normally include leaching by addition of a conventional leaching agent, such as zinc hydrosulfite, preferably with a flocculating agent, followed by filtering to remove soluble leaching salts. The leached clay slurry is then concentrated to the desired solids content, normally a 70% solids content slurry. Oftentimes the concentration step includes spray or acid drying of the clay with subsequent slurry formation to the desired solids content for shipment. The ultimate or intended use of the clay, e.g., in paper coatings, will often determine the precise combination of processing steps inasmuch as various properties of the product, i.e., its color or brightness, finished clay slurry viscosity, etc. can be tailored by various well-known refining steps.

As stated above, the present invention relates to a unique process for reducing the clay-water viscosity of crude kaolin clay ores which normally have such high inherent clay/water viscosities that they are unacceptable for use in conventional clay refining processes for producing high grade paper coating clay pigments. As is well-known in the art, such ores consist predominantly of the clay mineral kaolinite, a crystalline hydrated aluminum silicate of the formula: $Al_2O_3 \cdot 2SiO_2 \cdot 2H_2O$. There are vast deposits of such ores, particularly in Georgia, which have acceptable optical properties and purity for refining into paper coating pigments. However, these ore deposits also contain minor amounts of other clay minerals, such as montmorillonite, bentonite, etc., and other known and unknown contaminants which adversely affect the inherent clay/water viscosity thereof such that these ores cannot be refined in accordance with conventional clay refining techniques to produce high grade paper coating clay pigments. More specifically, these ores normally have inherent aqueous viscosities in excess of about 300 cps (Brookfield, 70% solids), often higher than 1200–1500 cps. When such ores are processed or refined in accordance with conventional clay pigment processing techniques such as described above, the resulting clay products usually have aqueous slurry viscosities in excess of about 250 cps, Brookfield (70% solids content), which is unacceptable for use in conventional paper coating techniques.

In the publication "The Viscosities Of Kaolin-Water Suspensions With Additions Of A Basic Aluminum Chloride Complex", by McCartney and Yeo, "Journal Of The Australian Ceramic Society", Vol. 1, No. 1 (1965), it has been reported that variations in the viscosity of aqueous suspensions of acid treated plastic ceramic kaolin clays are produced by the additions of a basic aluminum chloride complex of the formula $[Al_2(OH)_5Cl]_x$ at a range of different pH values. More specifically, the publication discloses that over the range of additions from zero to 0.3 ml per 100 ml of a water suspension of the specified acid treated plastic ceramic-type kaolin clay, the basic aluminum chloride complex caused a marked drop in viscosity at pH 5, resulted in intermediate viscosity changes at pH 7 while, at pH 10, it caused either a smooth increase to a nearly constant value or a drop to a minimum followed by an increase. However, as is well-known in the art, the acid treated plastic ceramic-type clays described in the publication are entirely distinguishable from above-described crude kaolin clay ores to which the present invention pertains, particularly from the standpoint of composition, clay-water suspension or slurry inherent viscosity problems, and the like. Such clays are normally employed exclusively in the ceramics industry, for, when slurried with water at high solids concentrations, they form an essentially plastic mass. On the other hand, so far as is known, no one has previously attempted to solve the problem of high inherent clay-water slurry viscosities of the above-described crude kaolin clay ores to which this invention pertains by employing any type of inorganic aluminum hydroxy polymer complex, or has previously provided a satisfactory process employing same for producing high grade clay pigments suitable for use in conventional paper coating techniques from such ores.

In carrying out the process of the present invention the above-described crude kaolin clay ore from the mine is initially crushed, moderately mixed or "blunged" with water, degritted and otherwise treated in accordance with the above conventional clay processing techniques to form an initial degritted aqueous clay slurry or slip having a clay solids content of preferably from about 10% to about 40%, based upon the weight of dry clay. Optimally, this initial aqueous clay slurry has about 20% clay solids content for we have found superior results in viscosity reduction are obtained when the slurry is formed at this level. The aqueous clay slurry is then contacted with an inorganic polymeric complex of the above formula either by direct addition of the polymer complex thereto or by in situ formation of the polymeric complex by direct addition of reactants which serve to produce the polymeric complex. The resulting treated clay slurry is thereafter filtered, fractionated, leached, etc. in accordance with conventional clay pigment processing techniques to provide a finished clay suitable for use as a paper coating clay pigment.

For the purpose of brevity, the term "aluminum hydroxide polymer" will be used below to refer to an inorganic polymeric complex of the formula set forth above and employed in accordance with the process of the invention.

In investigations and developments of the invention it has been discovered that significant and particularly advantageous viscosity reduction results are obtained if the aluminum hydroxide polymer is added following the initial formation of the aqueous crude clay slurry, after degritting, without dispersants and/or pH adjustment and prior to further conventional processing steps, e.g., fractionation, leaching, and the like. Thus, while the basic concept underlying the invention involves the treatment of crude kaolin clay slurries, significant advantages are obtained if the method of the invention is carried out in a particular sequence.

In carrying out the method of the invention in the preferred particular sequence, it is often desirable to wash and dry the crude clay after treatment with the aluminum hydroxide polymer prior to further processing. The washing removes polymer salts formed during the contact and treatment step while drying apparently shrinks the aluminum-clay structure which, oftentimes, are necessary to maintain inherent viscosity reduction, depending upon the particular crude kaolin clay ore being processed. However, as known, clay washing and drying steps are time consuming and often do not provide any significant improved results. Thus, it is best determined empirically whether washing and/or drying steps should be included in processing a particular crude kaolin clay ore in accordance with the process of the invention.

When included, any conventional washing and drying techniques may be employed. We have found that such conventional drying techniques as acid drying, spray drying, oven drying, etc., produce substantially similar results. Drying temperatures and times have not been found to be particularly critical. In fact, where acid or oven drying techniques are employed, we prefer to dry the treated clay for approximately 1 hour to a solids content of about 74%, based upon the weight of dry clay. Our investigations have shown that further drying, e.g., up to 90-100% solids, is unnecessary in that significant improvements in viscosity reduction are not obtained.

The aluminum hydroxide polymer employed in the process of the invention may be formed by mixing a compound selected from the group consisting of aluminum trichloride ($AlCl_3$), aluminum sulfate ($Al_2(SO_4)_3$), aluminum nitrate ($Al(NO_3)_3$), the hydrated form of these salts, and mixtures thereof, with a compound selected from the group consisting of sodium hydroxide (NaOH), ammonium hydroxide ($NH_4OH$), potassium hydroxide (KOH) and mixtures thereof. As previously mentioned, the aluminum hydroxide polymer may be formed in situ by addition of these reactants to the aqueous crude clay slurry or the preformed polymer may be added directly thereto. In accordance with either technique, these reactants are admixed in molar ratios sufficient to produce the above-described aluminum hydroxide polymer complex, which may be readily determined by any person having ordinary skill in the art without undue experimentation. By way of exemplification, an aluminum chlorohydroxide polymer complex within the scope of the above formula may be formed by admixing aluminum trichloride and sodium hydroxide in accordance with the equation:

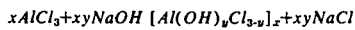

wherein $x = 6$ to 24 and $y = 1.0$ to 2.75. A preferred molar ratio of the aluminum hydroxide polymer complex is

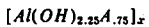

wherein $x = 6$ to 24 and $A$ is selected from the group consisting of $Cl^-$, $(SO_4^=)_{0.5}$ and $NO_3^-$.

Our investigations have shown that particularly superior results are obtained by treating a crude aqueous kaolin clay slurry in accordance with our process with an aluminum chlorohydroxide polymer complex produced by the exemplary equation illustrated above. The aluminum chlorohydroxide polymer material itself is commercially available being sold, e.g., by the Reheis Chemical Company under the trademark "CHLORHYDROL". Specific disclosures of this product, as well as methods of its production and use, are disclosed in U.S. Pat. Nos. 2,876,163 and 3,420,932 and British Pat. No. 845,670. Further, we particularly prefer to utilize the aluminum chlorohydroxide polymer complex in accordance with the above-described preferred molar ratio, e.g.,

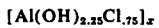

wherein $x = 6$ to 24. Still further, we prefer to utilize an aluminum chlorohydroxide polymer complex produced by admixing and reacting aluminum trichloride and sodium hydroxide, especially where the above-described in situ polymer formation technique is employed. Potassium hydroxide is technically a suitable substitute for sodium hydroxide but is not preferred solely because of its higher costs.

The polymer contacting step described above is usually carried out by admixing the aluminum hydroxide polymer complex with the initially formed aqueous crude clay slurry in an amount normally within the range of from about 0.1 to about 3.0% polymer per ton of clay, based upon the weight of dry clay. A preferred range is from about 0.25 to about 1.5% per ton of clay with the optimal amount primarily being dependent upon the particular polymer complex being utilized. Surprisingly, the amount of polymer complex employed does not necessarily decrease when treating crude kaolin clay ores having lower inherent clay-water viscosities in accordance with the process. Thus, the particular amount of polymer complex required to provide maximum viscosity reduction of a given crude kaolin clay ore is best determined empirically, which can be readily accomplished by any person having ordinary skill in the art without undue experimentation upon reading this specification. As illustrated in the examples set forth below we have found that the optimum amount of the above-preferred aluminum chlorohydroxide polymer complex, $[Al(OH)_{2.25}Cl_{.75}]_x$ wherein $x = 6$ to 24, is normally within the range of from about 0.5 to about 1.4% polymer per ton of clay (based upon weight of dried clay). On the other hand, the optimum amount of the polymer complex $[Al(OH_{2.25}(SO_4)_{.375}]_x$ wherein $x = 6$ to 24 employed in the process is about 0.5% per ton of dry clay.

After the aluminum hydroxide polymer, or above reactants for forming the polymer in situ, have been added to the clay/water slurry, the resulting reaction mixture is preferably mildly mixed or agitated utilizing any conventional apparatus, such as in-line mixers and the like, so as to provide intimate clay-polymer complex contact for reaction. Investigations have shown that the particular mixing speed employed is not critical. By way of example, where the clay slurry has an optimum 20% solids content, a tip speed from 150 feet/min. (200 rpm) to 400 feet/min. (500 rpm) is preferably utilized.

The reaction between the crude clay and the aluminum hydroxide polymer is usually completed within about 10 to about 15 minutes after polymer or in situ reactant addition. Accordingly, we prefer to carry out the contacting or treatment step for about that length of time prior to further clay processing steps. Of course, longer reaction times may be employed, but very little increase, if any, in viscosity reduction are obtained. In fact, excessively long treatment times, especially over 1 hour, often cause a loss in viscosity reduction obtained. Further, the contacting or reaction step is preferably carried out at ambient temperature, i.e., room temperature, and at atmospheric pressure.

Although the above-described aluminum hydroxide polymer treatment process is capable of significantly reducing the inherent clay/water viscosities of practically all crude kaolin clay ores having inherent viscosities in excess of about 300 cps (Brookfield, 70% clay solids) experiments have shown that the viscosity reductions obtained are adversely affected when the polymer-treated clay is further processed in accordance with conventional clay processing techniques to produce a finished paper coating clay pigment suitable for use as a paper coating clay. Specifically, we have found that conventional fractionating and leaching steps cause a slight loss in viscosity reduction of the polymer-treated clay. Thus, in preparing a finished clay having an acceptable aqueous clay slurry viscosity for use as a paper coating pigment product, e.g., below about 250 cps, preferably below about 200 cps (Brookfield 70% solids content), the above-described polymer treatment process of the present invention, alone, is primarily useful in refining crude kaolin clay ores having moderate inherent clay/water viscosities within the range of in excess of about 300 to about 900 cps, particularly those in excess of about 300 to about 600 cps (Brookfield, 70% solids content).

However, most unexpectedly we have discovered that the negative effects of fractionation and leaching on viscosity reduction during further processing of high viscoisty crude kaolin clay ores treated with the polymer complex as described above can be overcome by subjecting the polymer-treated clay to a high shear mixing action or kneading step. Surprisingly, the treatment of the aqueous crude clay slurry with the aluminum hydroxide polymer as described above in combination with subsequently subjecting the thus treated clay to a high speed mixing action or kneading produces a synergistic effect on clay/viscosity reduction. Specifically, we have discovered that the employment of both steps results in a finished clay pigment product (fractionated, leached, concentrated, etc.) having significantly lower clay/water slurry viscosities than finished clay products produced by employing either step alone.

We have also discovered that particularly superior results are obtained if the steps of the process are carried out in a particular sequence. Thus, in accordance with the preferred embodiment of the process, the crude kaolin clay ore from the mine is initially slurried with water, degritted and contacted or treated with the aluminum hydroxide polymer, all as described above. The thus-treated slurry is then filtered, washed to remove the polymer salts formed (if desired) and concentrated for kneading.

As known in the art, kneading involves the mechanical working of a plastic clay mass or body. Preferably, the clay is concentrated to a solids content suitable for kneading (about 74% clay solids) by filtration followed by partial drying as described above. Alternately, dry clay may be added to the filtered clay to achieve the desired solids content for kneading.

The kneading of the clay is then carried out through utilization of any conventional apparatus. As illustrated in the examples set forth below significant improvements in the clay/water viscosities of finished clays are obtained when the kneading step is carried out after the polymer complex contacting and treatment step and prior to the conventional processing steps of fractionation, leaching, etc. The particular amount of kneading or high shear mechanical mixing required will vary with the particular type of high viscosity crude kaolin clay ore being processed and is best determined empirically. We have found, however, that for crude kaolin clay ores having inherent clay/water viscosities of from about 300 to about 1200 cps (Brookfield, 70% solids content) it is usually sufficient to knead the clay at about 1½ kw for about 15 minutes (about 37 hp-hr/ton clay).

After kneading, the clay is then processed in accordance with conventional techniques, such as described above, which may include dispersing with a conventional dispersing agent, fractionating to obtain a fine fraction, leaching the fine fraction which may include adding a flocculating agent, filtering and then drying to obtain a finished clay pigment having a clay/water viscosity acceptable for use in conventional clay pigment paper coating techniques.

Through the employment of the immediately described preferred embodiment of the invention high grade paper coating quality finished clays having Brookfield viscosity values of less than 250 centipoises (70% solids) are capable of consistently being prepared from crude kaolin clay ores having high initial viscosities in excess of 1000 cps, especially those having viscoisites within the range of from about 600 to about 1200 cps. Such crude kaolin clay ores, when processed conventionally, would have unacceptable viscosity values, e.g., about 700 for 1000 cps crudes. Of course, this preferred embodiment is also particularly useful in preparing such high grade finished clay pigments from moderate viscosity crude kaolin clay ores, e.g., those hving viscosities within the range of in excess of about 300 to about 900 cps.

Another significant advantage of the invention lies in the surprising discovery that, in carrying out the preferred process embodiment, finished clays having equivalent and oftentimes improved brightness are obtained through employing reduced levels of leaching compound in the leaching step. Conventionally, the leaching step is carried out by employing leaching compounds, e.g., zinc hydrosulfite, at levels within the range of about 5 to about 10 lbs./ton of clay. However, when the above-preferred embodiment process is practiced, only about 2 to about 3 lbs. leaching compound per ton of clay may be employed during the leaching step.

Further, it has been found that a cold leaching technique (room temperature) may be employed and is, in fact, preferred. Experiments have shown that such cold leaching does not significantly increase the viscosity of the clay slurry, while leaching at elevated temperatures, e.g., 60°–70° C. oftentimes does. Thus, cold leaching, along with lower leaching compound requirements, provides further significant cost savings in producing finished high grade paper coating clay pigments in accordance with the practice of the above-preferred embodiment process.

The following examples particularly illustrate the nature of the inventive process but are not intended to be limitative thereof. Except where indicated the aluminum hydroxide polymer employed in the following examples was an aluminum chlorohydroxide polymer of the formula $[Al(OH)_{2.25}Cl_{.75}]_x$ wherein $x = 6$ to $12$ and was formed in situ by addition of aluminum trichloride and sodium hydroxide to the crude clay slurry in the required molar ratio. For the purpose of brevity, the term "aluminum chlorohydroxide polymer" and the abbreviated formula $Al(OH)_x^{+y}$ are often used interchangeably in the examples when referring to this specific compound. In addition, kneading, when used, was carried out at 1½ kw for about 15 minutes, which equals about 37 hp-hr/ton clay with the clay having 74% solids content. All viscosity measurements, Brookfield and Hercules, were taken on clay slurries having 70% clay solids, based on the weight of dry clay, in accordance with those well documented conventional techniques.

EXAMPLE I

A high viscosity crude kaolin clay ore was washed, degritted, filtered and dried in accordance with conventional clay processing techniques. This crude ore produced a base crude clay having a clay/water slurry Brookfield viscosity of 1177 cps (70% clay solids). A batch of the degritted crude clay was blunged with water to produce a clay/water slurry having 20% clay solids. A 1% solution of $[Al(OH)_{2.25}Cl_{.75}]_{6-12}$ per ton clay was prepared by mixing aluminum trichloride hexahydrate $AlCl_3 \cdot 6H_2O$ and NaOH in water in the required molar ratio and amounts. This polymer solution was then added to a portion of the 20% clay slurry, moderately mixed for 15 minutes at room temperature, filtered, washed twice 40% solids and dried. The test run was repeated with another portion of the 20% clay slurry except that a dispersing agent tetrasodium polyphosphate (TSPP) was added to the slurry at a rate of 4 lbs TSPP per ton of clay before the aluminum chlorohydroxide polymer was added.

Two other test runs were made using portions of the 20% solids clay slurry wherein the aluminum chlorohydroxide polymer was formed in situ at the same level and molar ratio by addition of $AlCl_3 \cdot 6H_2O$ and NaOH. The treatment steps were the same as above, including one test run having the dispersing agent added thereto. Control test runs were also conducted wherein the above treatment steps were repeated except for the addition of the aluminum chlorohydroxide polymer complex. Slurry viscosity and pH measurements were made for the treated clays from each test run, which are set forth in the following Table 1.

TABLE 1

| Mode | Dispersion | Brookfield Viscosity*, cps | pH |
|---|---|---|---|
| Pre-Mix | 4 No./ton TSPP | 330 | 7.2 |
| Pre-Mix | None | 280 | 7.1 |
| In Situ | 4 No./ton TSPP | 265 | 7.1 |
| In Situ | None | 199 | 7.2 |
| Control | 4 No./ton TSPP | 910 | 6.3 |

TABLE 1-continued

| Mode | Dispersion | Brookfield Viscosity*, cps | pH |
|---|---|---|---|
| | None | 906 | 6.2 |

*70% solids

The results of Table 1 illustrate the tremendous reduction in viscosity of a high viscosity kaolin clay crude achieved by treating the crude clay slurry with an aluminum hydroxide polymer complex in accordance with the process of the invention. The results further show that the process may be carried out by either direct polymer addition or by in situ polymer formation, and that superior viscosity reduction results are achieved by treating the aqueous clay slurry with the aluminum hydroxide polymer complex prior to further conventional processing steps, e.g., addition of a dispersing agent.

EXAMPLE II

A crude, degritted aqueous clay slurry having 20% clay solids was prepared from the kaolin clay crude of Example I in accordance with the procedure described therein. The slurry was split into three portions, and $AlCl_3 \cdot 6H_2O$ and NaOH were added to each portion for in situ formation of an aluminum chlorohydroxide polymer complex at a level of 0.5% polymer per ton of clay. However, the amount of NaOH added to each portion was varied in order to form the polymer complexes at different molar ratios. Each slurry-reactant mixture was moderately mixed for 15 minutes at room temperature, filtered and washed three times. The viscosity and pH measurements of the treated clays are set forth in the following Table 2.

TABLE 2

| Polymer Level, % | Molar Ratio | Brookfield Viscosity*, cps | pH |
|---|---|---|---|
| 0.5 | $Al(OH)_{1.75}Cl_{1.25}$ | 244 | 7.60 |
| 0.5 | $Al(OH)_{2.25}Cl_{.75}$ | 238 | 7.30 |
| 0.5 | $Al(OH)_{2.75}Cl_{.25}$ | 258 | 7.25 |

*70% solids

As the results of Table 2 illustrate, surprising crude clay slurry viscosity reductions are obtained by the process with the aluminum hydroxide polymer complex employed at different molar ratios. From the results it was determined that the optimal molar ratio of the polymer is $[Al(OH)_{2.75}Cl_{.75}]_{6-12}$.

EXAMPLE III

A degritted, crude kaolin clay aqueous slurry, having a 20% solids content, was prepared as described in Example I. The degritted crude clay had a viscosity of 1177 cps Brookfield and 18+/845 dynes Hercules (70% solids). Aluminum chloride, aluminum nitrate and aluminum sulfate, along with either sodium hydroxide or ammonium hydroxide were respectively added to separate portions of the slurry. The respective compounds were added to each slurry portion at a level calculated to yield .75% per ton $[Al(OH)_{2.25}A_{.75}]_{6-24}$ polymer, formed in situ. After reactant chemical addition each slurry portion was moderately mixed at room temperature for 15 minutes, filtered, washed and dried. Viscosity measurements were then taken on each resulting treated clay and are set forth in the following Table 3.

TABLE 3

| Treatment Chemicals | Viscosity (70% Solids) | |
|---|---|---|
| | Brookfield cps | Hercules dynes |
| AlCl$_3$ + NaOH | 166 | 13.1 |
| Al(NO$_3$)$_3$ + NaOH | 182 | 11.9 |
| Al$_2$(SO$_4$)$_3$ + NaOH | 318 | 16.6 |
| AlCl$_3$ + NH$_4$OH | 272 | 13.3 |
| Al(NO$_3$)$_3$ + NH$_4$OH | 276 | 12.4 |
| Al$_2$(SO$_4$)$_3$ + NH$_4$OH | 325 | 14.1 |

The results of Table 3 illustrate that aluminum chloride, aluminum nitrate and aluminum sulfate may be employed with either sodium hydroxide or ammonium hydroxide for producing an aluminum hydroxide polymer complex capable of providing significant viscosity reduction of high viscosity crude kaolin clay when employed in accordance with the process of the invention. Further, a comparison of the results of Table 3 shows that the employment of aluminum chloride and sodium hydroxide produces superior viscosity reduction and is, accordingly, preferred.

A test was also conducted to determine the effectiveness of potassium hydroxide (KOH) as a reactant compound for in situ formation of the aluminum hydroxide polymer complex. In the test a 20% aqueous slurry of a crude kaolin clay having an initial clay/water viscosity of 975 cps Brookfield and 18+/435 dynes Hercules (70% solids) was employed. Two tests were carried out, one employing aluminum trichloride and sodium hydroxide and the other employing aluminum trichloride and potassium hydroxide, respectively, as polymer formation reactants. A control run was also made with no reactants. All runs were carried out in accordance with the procedure described immediately above except that the test runs included addition of the chemicals at varying levels for aluminum hydroxide polymer formation at 0.25, 0.50 and 0.75% per ton clay. The results are set forth in the following Table 4.

TABLE 4

| Polymer Level %/ton | Viscosity, 70% Solids | | | |
|---|---|---|---|---|
| | AlCl$_3$/NaOH | | AlCl$_3$/KOH | |
| | Brookfield cps | Hercules dynes | Brookfield cps | Hercules dynes |
| Crude, initial | 975 | 18+/435 | 975 | 18+/435 |
| Control | 870 | 18+/525 | 860 | 18+/530 |
| 0.25 | 470 | 18+/610 | 380 | 18+/720 |
| 0.50 | 400 | 18+/635 | 376 | 18+/615 |
| 0.75 | 570 | 18+/670 | 492 | 18+/465 |
| 1.00 | 660 | 18+/755 | 990 | 18+/270 |

The results of Table 4 illustrate that potassium hydroxide is a suitable reactant compound for use in the process for producing the aluminum hydroxide polymer complex. Potassium hydroxide is, therefore, technically a suitable substitute for the preferred sodium hydroxide, although more expensive.

EXAMPLE IV

A series of tests were conducted to determine the level of aluminum hydroxide polymer required for the contacting step of the process of the invention. In a first series of tests a 20% solids degritted crude clay slurry of the kaolin base clay of Example I was prepared in accordance with the procedure described therein. Several portions of the slurry were respectively treated with an aluminum chlorohydroxide polymer at a molar ratio of [Al(OH)$_{2.25}$Cl$_{.75}$]$_{6-12}$ at various levels by addition of aluminum chloride and sodium hydroxide in the required amounts, followed by moderate mixing at room temperature for 15 minutes. The treated slurries were then filtered, washed and dried as described in Example II. The viscosity and pH measurements of the resulting treated clays are set forth in the following Table 5.

TABLE 5

| Polymer[1] Level, %/ton | Brookfield Viscosity, cps | pH |
|---|---|---|
| 0.25 | 530 | 6.5 |
| 0.50 | 222 | 8.35 |
| 0.75 | 196 | 8.2 |
| 1.00 | 174 | 8.3 |
| 1.25 | 181 | 7.8 |
| 1.50 | 154 | 8.4 |
| 3.00 | plastic | — |
| 0 (Control) | 910 | 6.3 |

[1][Al(OH)$_{2.25}$Cl$_{.75}$]$_{6-12}$ formed in situ.

As illustrated in Table 5, all levels of polymer tested produced significant viscosity reduction of the crude clay, except for the tests at the 0.25 and 3.00% levels. The test at 0.25% level did produce viscosity reduction, however. The results also show that the employment of the polymer complex at a level within the range of from 0.75 to 1.5% per ton of clay produced significantly superior viscosity reduction results for the clay tested.

A second series of tests was conducted to determine the optimum polymer level when an aluminum sulfate hydroxide polymer complex is employed. For these tests, aluminum sulfate and sodium hydroxide were added to separate portions of the above 20% solids clay slurry at differing levels to form in situ a polymer complex at the molar ratio [Al(OH)$_{2.25}$Cl$_{.75}$]$_{6-12}$. After chemical reactant addition the slurries were respectively moderately mixed for 15 minutes at room temperature, filtered, washed and dried as described above. As illustrated in the following Table 6, the aluminum sulfate hydroxide polymer complex employed produced viscosity reduction at all levels tested, although not as dramatic as the results set forth in Table 5. The results also show that, for the crude kaolin clay tested, the optimum level of aluminum sulfate hydroxy polymer was 0.5% per ton of clay.

TABLE 6

| Polymer Level[1] %/ton | Viscosity (70% Solids) | |
|---|---|---|
| | Brookfield cps | Hercules dynes |
| 0.10 | 630 | 16.4 |
| 0.25 | 400 | 13.1 |
| 0.50 | 318 | 11.7 |
| 1.00 | 436 | 14.0 |
| 1.25 | 680 | 15.9 |

[1]Al(OH)$_{2.25}$(SO$_4$)$_{.375}$

EXAMPLE V

A series of tests were conducted to determine the process parameters of the polymer treatment step of the process, including (A) time and temperature, (B) pressure, and (C) slurry reaction conditions.

A. Effect Of Time And Temperature

To measure the effect of these two parameters, two runs were made; one at room temperature (R.T.) and the other at 60°–70° C. The test runs were conducted by employing the 20% solids crude degritted aqueous clay slurry described in Example I. The clay slurry was split into two batches, and aluminum chloride and sodium hydroxide were added to each batch, respectively, at a level to form 1% aluminum chlorohydroxide polymer per ton clay. Both batches were then moderately mixed, one at room temperature and the other heated to 60°–70° C., for 1 hour with samples being taken at 15 minute intervals. Each of the samples were filtered, washed three times at 40% solids and dried. Viscosity measurements of the samples are set forth in the following Table 7.

TABLE 7

| Temperature | Brookfield Viscosity, cps (70% Solids) Time | | | |
|---|---|---|---|---|
| | 15 Mins. | 30 Mins. | 45 Mins. | 60 Mins. |
| R.T. | 174 | 198 | 164 | 167 |
| 60–70° C. | 196 | 194 | 197 | 185 |

The results of Table 7 show that the polymer complex-clay slurry reaction was essentially complete after the initial 15 minutes of contact both at room temperature and at elevated temperature. Additional contact times did not cause significant further viscosity reductions. A comparison of the results of the two test runs also illustrates that superior viscosity reduction is obtained when the polymer-clay reaction (contacting step) is carried out at room temperature.

B. Effect Of Pressure

To determine the effect of pressure on the aluminum hydroxide polymer clay slurry reaction, a crude kaolin clay having an inherent viscosity of 725 cps Brookfield, 18+/1055 dynes Hercules (70% clay solids) was blunged with water and degritted to form a crude aqueous clay slurry at 20% solids as described in Example I. $AlCl_3 \cdot 6H_2O$ and NaOH were added to separate portions of the clay slurry at the level of 0.75% aluminum chlorohydroxide polymer per ton of clay. Each polymer-slurry mixture was placed in a pressure vessel, heated to develop a desired pressure and moderately agitated under the pressure developed for a desired length of time. A control run was also conducted wherein a portion of the clay slurry was contacted with the same level of aluminum chlorohydroxide polymer at room temperature for 15 minutes under atmospheric pressure. After treatment each of the slurry portions were filtered, washed, dried and tested for viscosity. The results are in Table 8 below.

TABLE 8

| Pressure, psi | 70% Solids Viscosity | Retention Time, Minutes | | |
|---|---|---|---|---|
| | | 15 | 30 | 45 |
| 0 (Control) | Brookfield, cps | 154 | — | — |
| | Hercules, dynes | 11.6 | — | — |
| 5 | Brookfield, cps | 168 | 166 | 172 |
| | Hercules, dynes | 10.5 | 11.6 | 12.2 |
| 10 | Brookfield, cps | 168 | 178 | 180 |
| | Hercules, dynes | 11.5 | 13.5 | 12.7 |

TABLE 8-continued

| Pressure, psi | 70% Solids Viscosity | Retention Time, Minutes | | |
|---|---|---|---|---|
| | | 15 | 30 | 45 |
| 15 | Brookfield, cps | 184 | 186 | 182 |
| | Hercules, dynes | 12.7 | 12.2 | 13.2 |

The results of Table 8 show that the use of pressure during the polymer treatment step of the process does not product viscosity reductions of the clay greater than those achieved under atmospheric pressure. The results also confirm that the polymer clay reaction is essentially completed within about 15 minutes.

C. Clay Slurry Reaction Conditions

1. Effect of Clay Slurry Solids

In order to determine optimum slurry reaction conditions several degritted crude clay slurries were prepared at varying solids contents. The slurries were prepared employing the same kaolin clay crude (725 cps Brookfield) and procedure described in Example V.B. Several portions of each slurry were respectively treated with various levels of aluminum chlorohydroxide polymer by adding desired amounts of $AlCl_3 \cdot 6H_2O$ and NaOH at the required molar ratio, mixing for 15 minutes at room temperature and atmospheric pressure with a 3 inch turbine blade at 550 rpm and then filtering, washing and drying the treated clays as described in the above Examples. Viscosity measurements of the resulting clays are set forth in the following Table 9.

TABLE 9

| % Solids Slurry | | % Polymer[1] | | | | |
|---|---|---|---|---|---|---|
| | | 0.0 | 0.25 | .50 | .75 | 1.00 |
| 10 | Brookfield[2] | 650 | 354 | 266 | 204 | 160 |
| | Hercules | 17.5 | 14.3 | 12.3 | 10.5 | 9.9 |
| 20 | Brookfield | 670 | 360 | 242 | 172 | 174 |
| | Hercules | 16.4 | 16.7 | 13.1 | 10.3 | 11.5 |
| 30 | Brookfield | 740 | 344 | 220 | 204 | 226 |
| | Hercules | 17.0 | 17.2 | 16.3 | 15.0 | 18+/1090 |
| 40 | Brookfield | 670 | 320 | 232 | 222 | 270 |
| | Hercules | 14.9 | 16.5 | 18+/1040 | 16.5 | 14.5 |

[1] $[Al(OH)_{2.25}Cl_{.75}]_{6-12}$
[2] All viscosity values at 70% solids

A 50% solids slurry was also tested as described, but proved to be too difficult to process. No dispersant was used prior to reaction with the aluminum chlorohydroxide polymer. The data presented in Table 9 indicate optimum polymer treatment conditions for the kaolin clay crude tested to be 0.75% aluminum chlorohydroxide polymer per ton of clay mixed and reacted in a 20% solids slurry.

2. Effect of Mixing Speeds

In this series of tests, the crude, degritted clay slurry described in Example V.B. was employed (20% solids, 725 cps Brookfield viscosity). Several portions of the slurry were treated with 0.75% per ton aluminum chlorohydroxide polymer according to the procedure of Example V.C.1. except that different mixing intensities with the 3 inch turbine blade were employed. Control runs were also made under similar processing conditions without reactant additions.

As illustrated by the data in the following Table 10, the polymer treatment was carried out equally well at all rates of mixing speed. Accordingly, it is concluded that at 20% solids and 0.75% aluminum chlorohydroxide polymer modification, any mixing speed from 200–500 rpm is satisfactory for treating the kaolin clay crude.

TABLE 10

| Mixing Speed* rpm | 70% Solids Viscosity | | | |
|---|---|---|---|---|
| | Control | | Test | |
| | Brookfield cps | Hercules dynes | Brookfield cps | Hercules dynes |
| 200 | 600 | 16.7 | 174 | 11.9 |
| 300 | 600 | 16.3 | 166 | 11.8 |
| 400 | 590 | 15.3 | 172 | 12.2 |
| 500 | 610 | 17.1 | 174 | 12.7 |

*3 inch diameter impeller

EXAMPLE VI

A series of tests were conducted to determine the extent to which drying effects the viscosity of aluminum hydroxide polymer treated clay. A 20% solids degritted aqueous crude clay slurry was prepared from a crude kaolin clay ore having a Brookfield viscosity of 725 cps and a Hercules viscosity of 18+/1055 dynes as described in Example V.B. A portion of the clay slurry was treated with 0.75% aluminum chlorohydroxide polymer by addition of required amounts of $AlCl_3 \cdot 6H_2O$ and NaOH and mixing the resulting mixture for 15 minutes at room temperature under atmospheric pressure. The treated slurry was then filtered, washed and acid dried at 200°–210° F. over a period of from 1 to 6 hours. Samples of the slurry were taken every hour during drying and measured for viscosity (70% solids). A control run was also made with the clay slurry employing the same processing steps except for the addition of polymer forming reactants. The results are set forth in Table 11 below.

TABLE 11

| | Viscosity (70% Solids) | | | | | |
|---|---|---|---|---|---|---|
| | TEST | | | CONTROL | | |
| Drying Time Hrs. | Brookfield cps | Hercules dynes | Final Solids % | Brookfield cps | Hercules dynes | Final Solids % |
| 1 | 224 | 7.6 | 74.6 | 650 | 15.7 | 86.2 |
| 2 | 206 | 11.7 | 88.8 | 660 | 17.4 | 93.4 |
| 3 | 204 | 10.5 | 97.4 | 650 | 18+/1060 | 98.0 |
| 4 | 178 | 10.3 | 98.4 | 660 | 16.5 | 98.8 |
| 5 | 164 | 9.2 | 99.0 | 650 | 16.7 | 99.2 |
| 6 | 166 | 11.7 | 99.4 | 660 | 18+/1090 | 99.4 |

As illustrated in Table 11, 88% of the total possible viscosity reduction was achieved after only 1 hour drying to a cake solids of 74.6%. While continued drying did enhance the viscosity reduction, the reduction in process time (from 5 hours to 1 hour drying) may be important from a commercial standpoint. Furthermore, in the practice of the preferred embodiment of the process of the invention, which includes a kneading step after the aluminum hydroxide polymer treatment step, such kneading is preferably carried out at a solids content of about 74%.

EXAMPLE VII

A series of tests was run to determine the effect and necessity of subjecting the clay to mechanical work and/or shear following the treatment of the crude clay slurry with aluminum chlorohydroxide polymer for producing a finished clay pigment product. A crude kaolin clay ore was blunged with water and degritted (200 mesh) in accordance with the procedure described in Example I to produce an aqueous crude slurry having 20% solids. The crude clay had an initial viscosity of 550 cps Brookfield and 17.8 dynes Hercules (70% solids). $AlCl_3 \cdot 6H_2O$ and NaOH were added to the crude slurry in required amounts to form in situ 0.75% $[Al(OH)_{2.25}Cl_{.75}]_{6-12}$ per ton of clay, based upon the weight of dry clay. The polymer-clay slurry reaction mixture was moderately mixed at room temperature and atmospheric pressure for 15 minutes. The slurry was then filtered, washed at 40% solids and acid dried (200°–210° F.) to 74% clay solids content. The resulting polymer-treated clay was then split for making two processing runs. In one run, the polymer-treated clay was subjected to moderate shear by kneading at 1½ kw for 15 minutes (37 hp-hr/ton clay) employing a conventional pug mill. The kneaded clay was then dispersed by the addition of a dispersing agent (4 lbs. tetrasodium polyphosphate per ton clay) and fractionated to a No. 2 grade clay per conventional clay pigment processing techniques. The fractionated clay was then leached at room temperature by the addition of 2 lbs. zinc hydrosulfite per ton clay, filtered and acid dried (200°–210° F.) to produce a finished clay product, also in accordance with conventional clay processing techniques except for the amount of leaching agent employed.

The second processing run was carried out identically as above, but with the exception of eliminating the kneading step. Control runs were also made employing the same clay and processing steps except for the elimination of the aluminum hydroxide polymer treatments in both runs and elimination of the kneading step in one run. Viscosity measurements were made of samples taken from all runs after the various processing steps, the results of which are set forth in Table 12 below. All viscosity measurements were made at 70% clay solids content.

TABLE 12

| EFFECT OF KNEADING AND POLYMER TREATMENT ON FINISHED CLAY VISCOSITY | | | | |
|---|---|---|---|---|
| Tests - Process | Test .75% $Al(OH)_x{}^+y$[1] + Kneading | Control No Chemicals + Kneading | Test .75% $Al(OH)_x{}^+y$ + No Kneading | Control No Chemicals + No Kneading |
| After $Al(OH)_x{}^+y$ Reaction | | | | |
| Brookfield, cps | 156 | 460 | 150 | 432 |
| Hercules, dynes | 11.5 | 15.0 | 9.5 | 13.8 |
| After Kneading | | | | |
| Brookfield, cps | 76 | 174 | — | — |
| Hercules, dynes | 2.3 | 3.6 | — | — |
| After Fractionation and Leaching[2] | | | | |
| Particle Size, | | | | |
| −2 microns | 83.5 | 81.0 | 79.0 | 80.5 |
| Brookfield, cps | 150 | 220 | 476 | 820 |

TABLE 12-continued

EFFECT OF KNEADING AND POLYMER TREATMENT ON FINISHED CLAY VISCOSITY

| Tests - Process | Test .75% $\overline{Al(OH)_x^+y}$[1] + Kneading | Control No Chemicals + Kneading | Test .75% $\overline{Al(OH)_x^+y}$ + No Kneadng | Control No Chemicals + No Kneading |
|---|---|---|---|---|
| Hercules, dynes | 5.3 | 7.0 | 18+/485 | 18+/415 |

[1] $[Al(OH)_{2.25}Cl_{.75}]_{6-12}$
[2] All clays leached at room temperature with 2 lbs./ton zinc hydrosulfite (0.1 wt. %)

As illustrated by a comparison of the results of Table 12 the inherent viscosity of the crude clay was significantly reduced by treatment with the aluminum chlorohydroxide polymer complex. However, some of the viscosity reduction obtained was lost when the polymer-treated clay was subsequently processed, i.e., subsequently fractionated, leached, etc. The data also illustrates that subjecting the crude clay to a kneading step without aluminum chlorohydroxide polymer treatment was capable of reducing the viscosity to 220 cps Brookfield after subsequent processing.

On the other hand yet, as illustrated, the employment of the polymer treatment step in conjunction with the kneading step produced a significantly lower finished clay viscosity of 150 centipoises Brookfield. The results of Table 12 accordingly confirm the surprising synergistic effect of employing the aluminum hydroxide polymer treatment step and the kneading step in producing a finished clay product of significantly reduced viscosity.

For the purpose of brevity, the process run including the polymer-treatment step followed by the kneading step described in Example VII above will be referred to below as the "React-Knead Process".

EXAMPLE VIII

The crude kaolin clay ore of Example I was blunged with water, degritted and processed as described to form a degritted aqueous crude clay slurry of 20% solids. The crude clay had a viscosity of 1177 centipoises Brookfield (70% solids). The crude aqueous slurry was divided into several portions, each of which was processed to a finished clay employing a variety of processing step sequences to determine the effect of processing sequence on viscosity reduction. The processing step sequence employed for each test run is set forth in the following Table 13. Each processing step employed was carried out as described in Example VII, except where indicated.

TABLE 13

THE EFFECT OF PROCESSING SEQUENCE ON FINISHED CLAY VISCOSITY

| | 70% solids VISCOSITY | | | |
|---|---|---|---|---|
| | TEST | | CONTROL | |
| PROCESSING SEQUENCE | Brookfield cps | Hercules dynes | Brookfield cps | Hercules dynes |
| Treat[1] 1% - 1 wash - knead - fract - leach[2] 2 lbs./ton | 180 | 4.6 | 342 | 4.5 |
| Treat 1% - 1 wash - knead - fract - treat 1% - leach 3 lbs./ton | 334 | 11.2 | — | — |
| Treat 1% - 1 wash - knead - fract - treat 0.5% (no leach) | 164 | 4.2 | — | — |
| Treat 1% - 2 wash - knead - fract - leach 2 lbs./ton | 224 | 3.8 | 800 | 7.3 |
| Treat 1% - 2 wash - knead - fract - treat 0.5% - wash - leach 2 lbs./ton | 246 | 6.5 | — | — |
| Treat 1% - 2 wash - knead - fract - treat 1% - leach 2 lbs./ton | 354 | 9.6 | — | — |
| Fract - knead - treat 0.5% | 430 | 8.0 | — | — |
| Fract - knead - treat 1.0% | 362 | 6.1 | — | — |
| Fract - knead - treat 1.4% | 286 | 11.7 | — | — |
| Fract - knead - treat 1.0% - leach 1 lb./ton | 496 | 18+/1060 | — | — |
| Fract - knead - treat 1.0% - leach 2 lbs./ton | 540 | 18+/1060 | — | — |
| Fract - knead - treat 1.0% - leach 3 lbs./ton | 580 | 18+/935 | — | — |
| Knead - treat 1.4% - wash - fract - cold leach[3] 2 lbs./ton | 740 | 18+/925 | — | — |
| Treat 1.4% - wash - knead - fract - cold leach 2 lbs./ton | 150 | 3.3 | 580 | 18+/670 |

[1] Indicates level of $[Al(OH)_{2.25}Cl_{.75}]6-1$
[2] Leaching with zinc hydrosulfite at 60-70° C.
[3] Leaching with zinc hydrosulfite at room temperature.

A comparison of the results of Table 13 illustrates that the clay processing sequence significantly affects viscosity reduction. It will be noted that the last run set forth in Table 13 was carried out in accordance with the "React-Knead Process" described in Example VII. This test run produced the most significant viscosity reduction results, i.e., the reduction in viscosity from 1177 cps to 150 cps Brookfield at 70% solids. The first test run set forth in Table 13 was also carried out according to the preferred "React-Knead Process" except a hot leaching step (60°-70° C.) was employed, and also provided significantly superior viscosity reduction in the finished clay.

EXAMPLE IX

A 20% solids degritted aqueous crude clay slurry was prepared from the crude kaolin clay described in Example VIII employing the procedure described therein. The clay slurry was divided into three portions wherein a first portion was processed to a finished clay employing the "React-Knead Process" described in Example VII employing the aluminum chlorohydroxide polymer complex at a level of 1.4% per ton of clay. The second portion was similarly processed, except that aluminum sulfate was employed in place of aluminum chloride for in situ formation of $[Al(OH)_{2.25}(SO_4)_{.375}]_{6-12}$ at a level of 0.5% per ton of clay. The third portion of the clay slurry was similarly processed as a control, except for treatment with an aluminum hydroxide polymer complex. Viscosity measurements were made on samples taken from each run after each processing step, the results of which are set forth in the following Table 14.

with the aluminum chlorohydroxide polymer. The data of the following Table 15 illustrates that the viscosity

TABLE 14

THE EFFECT OF [Al(OH)$_{2.25}$Cl$_{.75}$] VERSUS [Al(OH)$_{2.25}$(SO$_4$)$_{.375}$] ON VISCOSITY

| | Viscosity (70% Solids) | | | | | |
|---|---|---|---|---|---|---|
| | Control | | [Al(CH)$_{2.25}$Cl$_{.75}$] at 1.4%/ton | | [Al(OH)$_{2.25}$(SO$_4$)$_{.375}$] at 0.5%/ton | |
| Process Step | Brookfield cps | Hercules dynes | Brookfield cps | Hercules dynes | Brookfield cps | Hercules dynes |
| Crude Clay | 1177 | 18+/845 | 1177 | 18+/845 | 1177 | 18+/845 |
| After: | | | | | | |
| Reaction | 790 | 18+/1050 | 236 | 8.4 | 418 | 13.0 |
| Kneading | 360 | 8.2 | 169 | 3.5 | 196 | 4.2 |
| Fractionation | 680 | 18+/1000 | 282 | 4.5 | 1140 | 18+/850 |
| Leaching | 580 | 18+/670 | 180 | 4.6 | 358 | 4.7 |

The data in Table 14 illustrates that the preferred embodiment method of the invention may be carried out by employing an aluminum sulfate hydroxide polymer complex. Although the level of viscosity reduction obtained in the finished clay product is not as significant as that obtained with aluminum chlorohydroxide polymer treatment, it is still superior to that obtained with no polymer treatment step followed by kneading.

values of the finished test clays were significantly lower than those of the controls, with the exception of the finished clay prepared from the 158 cps Brookfield low viscosity crude. The data specifically illustrates that the process of the invention is capable of reducing the viscosity of a wide variety of intermediate and high viscosity kaolin clay crudes for producing finished clay pigments having viscosities suitable for use as paper coating pigments.

TABLE 15

| | Viscosity, cps (70% solids) | | | | | | | | | |
|---|---|---|---|---|---|---|---|---|---|---|
| | 100–200 | | 300–400 | | 500–600 | | 700–800 | | 900–1100 | |
| | Control | Test | Control | Test | Control | Test | Control | Test | Control | Test |
| Optimum Level Al(OH)$_x$+$^y$, % | — | .75 | — | 1.0 | — | .75 | — | .75 | — | 1.4 |
| Initial Crude: | | | | | | | | | | |
| Brookfield, cps | 158 | | 328 | | 530 | | 725 | | 1177 | |
| Hercules, dynes | 14.2 | | 18+/725 | | 18+/1040 | | 18+/1055 | | 18+/845 | |
| Brightness, % | 82.8 | | 80.6 | | 81.1 | | 79.1 | | 83.2 | |
| After Reaction: | | | | | | | | | | |
| Brookfield, cps | 146 | 126 | 322 | 136 | 550 | 146 | 740 | 180 | 790 | 206 |
| Hercules, dynes | 11.3 | 11.1 | 18+/875 | 12.1 | 18+/935 | 10.6 | 17.3 | 11.6 | 18+/1050 | 10.0 |
| Brightness, % | 83.9 | 84.3 | 80.9 | 81.0 | 80.8 | 81.6 | 81.0 | 81.5 | 83.9 | 94.1 |
| After Kneading and Fractionation: | | | | | | | | | | |
| Brookfield, cps | 120 | 140 | 180 | 136 | 246 | 173 | 274 | 206 | 680 | 178 |
| Hercules, dynes | 4.7 | 6.1 | 7.7 | 4.7 | 7.3 | 6.1 | 6.7 | 5.6 | 18+/1000 | 8.4 |
| Brightness, % | 85.6 | 85.9 | 81.8 | 82.5 | 81.8 | 83.8 | 82.0 | 83.1 | — | |
| After Leaching: | | | | | | | | | | |
| Brookfield, cps | 120 | 158 | 192 | 136 | 242 | 180 | 266 | 184 | 580 | 150 |
| Hercules, dynes | 4.7 | 11.0 | 10.8 | 5.4 | 7.3 | 7.9 | 8.0 | 6.0 | 18+/670 | 8.3 |
| Brightness, % | 87.0 | 88.0 | 82.9 | 83.8 | 82.9 | 84.3 | 83.2 | 84.3 | 86.3 | 87.2 |

EXAMPLE X

Several degritted aqueous crude clay slurries having 20% solids were prepared according to the procedure of Example I from a number of crude kaolin clays having a wide viscosity range, i.e., from 158–1177 cps Brookfield at 70% solids. A portion of each clay slurry was processed to a finished clay according to the "React-Knead Process" described in Example VII. Each slurry portion was processed identically except for the optimum level of aluminum chlorohydroxide polymer employed. For comparison, control runs were also made employing similar processing steps with the exception of eliminating the treatment of each slurry

EXAMPLE XI

A storage stability test was run on a 0.75%/ton aluminum chlorohydroxide treated clay prepared according to the "React-Knead Process" set forth in Example VII. The modified, finished clay was allowed to stand at ambient temperature for 2 months. A finished clay, processed similarly except for the polymer treatment step, was also tested as a control. The results set forth in the following Table 16 illustrate that clay slurries prepared from clays processed according to the invention are extremely stable during storage.

TABLE 16

STABILITY OF Al(OH)$_x$+$^y$ MODIFIED FINISHED CLAY

| | 70% solids Viscosity | | | | |
|---|---|---|---|---|---|
| | Initial | 2 Weeks | 4 Weeks | 6 Weeks | 8 Weeks |
| Control: | | | | | |
| Brookfield, cps | 900 | 1320 | 1080 | 1040 | 1100 |
| Hercules, dynes | 18+/625 | 18+/415 | 18+/450 | 18+/555 | 18+/540 |
| Test: | | | | | |
| Brookfield, cps | 236 | 260 | 256 | 262 | 292 |
| Hercules, dynes | 10.2 | 12.9 | 11.0 | 14.6 | 18+/925 |

EXAMPLE XII

A crude kaolin clay having a Brookfield viscosity of 725 cps Brookfield was processed according to the "React-Knead Process" described in Example VII. The resulting finished clay pigment was compared to a control clay, similarly processed except for the polymer treatment step, as a paper coating clay pigment. Both clays were employed in the following lightweight publication coating formulation:

100 parts clay
14 parts starch
2 parts Dow 620 latex

Coat weights of 5.0 lbs/ream were applied to the wire side of a 26 lbs/ream publication basestock with a Keegan trailing blade coater. The coated papers were supercalendered and evaluated for optical and printing characteristics. The results of the test are set forth in Table 17 below.

TABLE 17
COATING STUDY OF TREATED CLAY

| PIGMENT PROPERTIES: | Control | .75% Al(OH)$_x^{+y}$ |
|---|---|---|
| Elrepho Brightness, % | 83.2 | 84.3 |
| Viscosity; 70% Solids | | |
| Brookfield, 20 rpm, cps | 266 | 184 |
| Hercules, dynes/1100 rpm | 8.0 | 6.0 |
| COLOR PROPERTIES: | | |
| Viscosity; 58% Solids | | |
| Brookfield, 20 rpm, cps | 7900 | 7400 |
| Hercules, dynes/1100 rpm | 10.3 | 10.2 |
| COATED PROPERTIES: | | |
| G. E. Brightness, % | 65.5 | 66.8 |
| 75° Gloss, % | 30.5 | 30.4 |
| Opacity, Uncalendered, % | 87.57 | 88.27 |
| Calendered, % | 86.53 | 87.13 |
| Man Print Quality | 51 | 51 |
| Whiteness Factor | 44.0 | 46.4 |
| IGT, No. 4 Ink, cm/sec | 191 | 163 |
| K&N Ink Absorption | 71.9 | 69.1 |

Although the clay processed by the "React-Knead Process" did reduce the clay/water viscosity by about 30%, the coating color viscosity was reduced by only 6%. However, significant improvements in coated brightness, whiteness and opacity were observed with the treated clay. Gloss and print quality were not affected, but the treated clay showed a slight decrease in ink holdout and IGT pick resistance.

Obviously, many modifications and variations of the invention as hereinbefore set forth may be made without departing from the spirit and scope thereof, and, therefore, only such limitations should be imposed as are indicated in the appended claims.

We claim:

1. A method for reducing the viscosity of crude kaolin clay ores for producing clay pigments comprising contacting a clay/water slurry of said crude kaolin clay with an inorganic polymer complex having the general formula:

$$[Al(OH)_y A_{3-y}]_x$$

wherein $x = 6$ to 24, $y = 1.0$ to 2.75 and $A$ is selected from the group consisting of $Cl^-$, $(SO_4^=)_{0.5}$ and $NO_3^-$.

2. The method of claim 1, wherein the inorganic polymeric complex is formed in situ in the crude kaolin clay/water slurry by the addition thereto of a compound selected from the group consisting of $AlCl_3$, $Al_2(SO_4)_3$, $Al(NO_3)_3$, their various hydrated forms and mixtures thereof, and a compound selected from the group consisting of NaOH, NH$_4$OH, KOH and mixtures thereof in respective amounts for producing the inorganic polymeric complex.

3. The method of claim 1, including subjecting the crude kaolin clay/water slurry contacted with the inorganic polymeric complex to shear before further processing.

4. The method of claim 1, wherein the crude kaolin clay/water slurry is subjected to a high shear mixing action or kneading following the contacting with the inorganic polymeric complex and before further processing thereof.

5. The method of claim 1, wherein the inorganic polymeric complex is present in an amount of from about 0.1 to below about 3.0% per ton of crude clay, based upon the weight of dry clay.

6. The method of claim 1, wherein the crude kaolin clay has an initial clay/water viscosity of at least 300 centipoises Brookfield at 70% solids.

7. The method of claim 1, wherein the contacting is carried out at about room temperature for a time period of about 10 to about 15 minutes.

8. A method for reducing the viscosity of crude kaolin clay ores comprising contacting a crude clay/water slurry of said kaolin clay ore with an inorganic polymeric complex having the general formula:

$$[Al(OH)_{2.25}A_{.75}]_x$$

wherein $x = 6$ to 24 and $A$ is selected from the group consisting of $Cl^-$, $(SO_4^=)_{0.5}$ and $NO_3^-$.

9. A method for reducing the viscosity of crude kaolin clays, said method comprising the steps of contacting a crude kaolin clay/water slurry with a polymeric complex having the general formula:

$$[Al(OH)_y Cl_{3-y}]_y$$

wherein $x = 6$ to 24 and $y = 1.0$ to 2.75.

10. The method of claim 9, wherein said polymeric complex is formed in situ in the crude kaolin clay/water slurry by the addition of aluminum trichloride and sodium hydroxide to the slurry in accordance with the equation $$xAlCl_3 + xyNaOH \rightarrow [Al(OH)_y Cl_{3-y}]_x + xyNaCl$$

wherein $x = 6$ to 24 and $y = 1.0$ to 2.75.

11. The method of claim 9, wherein said clay/water slurry is subjected to a high shear mixing action or kneading following contacting with said polymeric complex and before further processing thereof.

12. The method of claim 9, wherein the crude kaolin clay has an initial clay/water viscosity of at least 300 centipoises Brookfield at 70% solids.

13. The method of claim 9, wherein said polymer complex is formed in situ in said kaolin clay/water slurry by the addition of aluminum trichloride and sodium hydroxide thereto in accordance with the equation:

$$xAlCl_3 + 2.25x\ NaOH \rightarrow [Al(OH)_{2.25}Cl_{.75}]_{6\text{-}24} + 2.25x\ NaCl$$

said aluminum trichloride and sodium hydroxide being added in amounts to produce the polymeric complex in the clay/water slurry in an amount within the range of from about 0.25% to about 1.5% per ton of clay, based upon the weight of dry clay.

14. The method of claim 13, including subjecting the crude kaolin clay/water slurry contacted with the polymer complex to a high shear mixing action or kneading before further processing thereof.

15. The method of claim 14, wherein the kaolin clay/water slurry is contacted with the polymeric complex for about 10 to about 15 minutes at about room temperature.

16. The method of claim 13, wherein the crude kaolin clay has an initial clay/water viscosity of at least 300 centipoises Brookfield at 70% solids.

17. A method for refining crude kaolin clay ores having a wide initial crude clay/water viscosity range, said method comprising the steps of:
forming a slurry of crude kaolin clay in water having a solids content of from about 10 to about 40% by weight;
degritting the crude clay/water slurry;
contacting the crude clay/water slurry with an inorganic polymeric complex having the formula $$[Al(OH)_y A_{3-y}]_x$$

wherein $x = 6$ to $24$, $y = 1.0$ to $2.75$, and $A$ is selected from the group consisting of $Cl^-$, $(SO_4^-)_{0.5}$ and $NO_3^-$;
subjecting the crude clay/water slurry to a high shear mixing action or kneading;
fractionating the crude clay/water slurry to form coarse and fine fractions of said clay;
leaching the fine fraction of the classified clay/water slurry;
filtering the leached clay/water slurry;
concentrating the resulting filter cake to a desired clay solids; and
recovering the clay as a finished clay pigment product.

18. The method of claim 17, wherein the crude kaolin clay has an initial clay/water viscosity of at least 300 centipoises Brookfield at 70% solids.

19. The method of claim 17, wherein the inorganic polymeric complex has the formula:

$$[AL(OH)_{1.25} A_{.75}]_x$$

wherein $x = 6$ to $24$ and $A$ is selected from the group consisting of $Cl^-$, $(SO_4^-)_{0.5}$ and $NO_3^-$.

20. The method of claim 17, wherein the inorganic polymeric complex is formed in situ in the crude kaolin clay/water slurry by the addition thereto of a compound selected from the group consisting of $AlCl_3$, $Al_2(SO_4)_3$, $Al(NO_3)_3$, their various hydrated forms and mixtures thereof, and a compound selected from the group consisting of $NaOH$, $NH_4OH$, $KOH$ and mixtures thereof, in respective amounts to produce the polymeric complex.

21. The method of claim 20, wherein the respective compounds are added in respective amounts to produce the inorganic polymeric complex in situ in an amount of from about 0.1% to below about 3.0% per ton of clay, based upon the weight of dry clay.

22. The process of claim 17, wherein the inorganic polymeric complex has the formula:

$$[Al(OH)_{2.25} Cl_{.75}]_x$$

wherein $x = 6$ to $24$.

23. The method of claim 22, wherein the polymeric complex is formed in situ by addition to the clay/water slurry aluminum trichloride and sodium hydroxide in accordance with the equation:

$$xAlCl_3 + 2.25x\ NaOH\ [Al(OH)_{2.25}Cl_{.75}]_{6.24} + 2.25x\ NaCl$$

the aluminum trichloride and sodium hydroxide being added in respective amounts to produce the polymer complex in situ in an amount of from about 0.25% to about 1.5% per ton of clay, based upon the weight of dry clay.

24. The process of claim 17, wherein the clay/water slurry is contacted with the inorganic polymeric complex at about room temperature for about 10 to about 15 minutes.

25. The process of claim 17, wherein the clay/water slurry contacted with the inorganic polymeric complex is concentrated and then subjected to a high shear mixing action or kneading at the rate of about 37 hp-hr/ton of clay.

26. The process of claim 25, wherein the crude kaolin clay has an initial clay/water viscosity of at least 300 centipoises Brookfield at 70% solids.

27. The process of claim 26, wherein the initially formed slurry of crude kaolin clay in water has a solids content of about 20% by weight.

* * * * *